(12) United States Patent
Ting et al.

(10) Patent No.: US 10,491,039 B2
(45) Date of Patent: Nov. 26, 2019

(54) POWER TRANSFER CIRCUIT AND METHOD UTILIZING POWER CAPABILITY PROCLAMATION TO TRANSFER ELECTRICAL POWER TO CHARGER

(71) Applicant: MediaTek Inc., Hsin-Chu (TW)

(72) Inventors: Ming-Chiang Ting, Hsinchu (TW); Fu-Chi Lin, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 355 days.

(21) Appl. No.: 15/241,334

(22) Filed: Aug. 19, 2016

(65) Prior Publication Data

US 2017/0077753 A1    Mar. 16, 2017

Related U.S. Application Data

(60) Provisional application No. 62/276,258, filed on Jan. 8, 2016, provisional application No. 62/218,773, filed on Sep. 15, 2015.

(51) Int. Cl.
*H02J 7/02* (2016.01)
*H02J 50/10* (2016.01)
*H02J 50/80* (2016.01)
*H02M 1/00* (2006.01)

(52) U.S. Cl.
CPC ............ *H02J 50/10* (2016.02); *H02J 7/025* (2013.01); *H02J 50/80* (2016.02); *H02M 2001/0003* (2013.01)

(58) Field of Classification Search
CPC ............................................. H02M 2001/0003
See application file for complete search history.

(56) References Cited

U.S. PATENT DOCUMENTS

| 2014/0036560 | A1 | 2/2014 | Satyamoorthy et al. |
| 2015/0021478 | A1 | 1/2015 | Lee et al. |
| 2016/0197500 | A1* | 7/2016 | Liang ............ H02H 3/085 320/114 |

FOREIGN PATENT DOCUMENTS

| CN | 101807805 A | 8/2010 |
| CN | 103458556 A | 12/2013 |

* cited by examiner

*Primary Examiner* — Daniel J Cavallari
(74) *Attorney, Agent, or Firm* — Wolf, Greenfield & Sacks, P.C.

(57) ABSTRACT

A power transfer circuit for transferring electrical power from a power source to a charger is provided. The power transfer circuit includes a voltage regulation circuit and a control circuit. The voltage regulation circuit is arranged for providing an output voltage for the charger, and adjusting the output voltage according to a control signal, wherein the charger draws an output current from the voltage regulation circuit according to the output voltage. The control circuit is coupled to the voltage regulation circuit, and is arranged for detecting the output current to generate a detection result, and generating the control signal at least according to the detection result.

14 Claims, 7 Drawing Sheets

POWER TRANSFER CIRCUIT AND METHOD UTILIZING POWER CAPABILITY PROCLAMATION TO TRANSFER ELECTRICAL POWER TO CHARGER

RELATED APPLICATIONS

This application claims priority under 35 U.S.C. § 119(e) to U.S. Provisional Application Ser. No. 62/218,773, entitled "PROGRAMMABLE POWER PROCLAIM FOR WIRELESS POWER TRANSFER" filed on Sep. 15, 2015, and U.S. Provisional Application Ser. No. 62/276,258, entitled "PROGRAMMABLE POWER PROCLAIM FOR WIRELESS POWER TRANSFER" filed Jan. 8, 2016, each of which is incorporated herein by reference in its entirety.

BACKGROUND

The disclosed embodiments of the present invention relate to power transfer, and more particularly, to a power transfer circuit utilizing power capability proclamation to transfer electrical power from a power source to a charger, and a related power transfer method.

A conventional switching charger utilizes adaptive input current control (AICC) to regulate an input current limit for tracking a maximum power capability of an adaptor, and further utilizes poor adaptor management (PAM) to set input current limit regulation in order to avoid direct current (DC) bus voltage collapse (e.g. undervoltage lockout (UVLO)) and allow a poor adaptor to perform battery charging continuously.

However, power of a wireless power receiver unit (PRU) is limited by power of a wireless power transmitter unit (PTU) and coil efficiency, and collapses easily when provided for a switching charging employing AICC. Specifically, when the wireless PRU supplies power to the switching charging employing AICC, the switching charging tracks a maximum power capability of the wireless PRU, and the wireless PTU collapses easily since no power limit of the wireless PRU is available.

Thus, there is a need for a novel power transfer mechanism to stably supply power to a charger without voltage collapse.

SUMMARY

In accordance with exemplary embodiments of the present invention, a power transfer circuit utilizing power capability proclamation to transfer electrical power from a power source to a charger, and a related power transfer method are proposed to solve the above-mentioned problems.

According to an embodiment of the present invention, an exemplary power transfer circuit for transferring electrical power from a power source to a charger is disclosed. The exemplary power transfer circuit comprises a voltage regulation circuit and a control circuit. The voltage regulation circuit is arranged for providing an output voltage for the charger, and adjusting the output voltage according to a control signal, wherein the charger draws an output current from the voltage regulation circuit according to the output voltage. The control circuit is coupled to the voltage regulation circuit, and is arranged for detecting the output current to generate a detection result, and generating the control signal at least according to the detection result.

According to an embodiment of the present invention, an exemplary power transfer method for transferring electrical power to a charger is disclosed. The exemplary power transfer method comprises the following steps: providing an output voltage for the charger, wherein the charger draws an output current according to the output voltage; detecting the output current to generate a detection result; and generating a control signal at least according to the detection result, and adjusting the output voltage according to the control signal.

The proposed power transfer mechanism may proclaim a power capability to a charger so as to reduce/eliminate the chance of power collapse, and program a V-I curve suitable for the charger according to operating scenarios.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

In order to reduce/eliminate the chance of power collapse, the proposed power transfer mechanism may proclaim a power capability of a power transfer circuit (e.g. a wireless charging receiver or a power adaptor) supplying power to a charger. For example, when a current drawn by the charger is too high, the proposed power transfer mechanism may adjust a voltage level received at the charger so as to inform the charger of a proclaimed power level, and the charger may reduce an amount of the drawn current accordingly. In other words, the proposed power transfer mechanism may monitor a power level supplied to the charger, set/program an output voltage level to a poor adaptor management (PAM) level of the charger, and provide the charger with power capability information of the power transfer circuit, thus reducing/eliminating the chance of power collapse. Further description is provided below.

Figure 1:
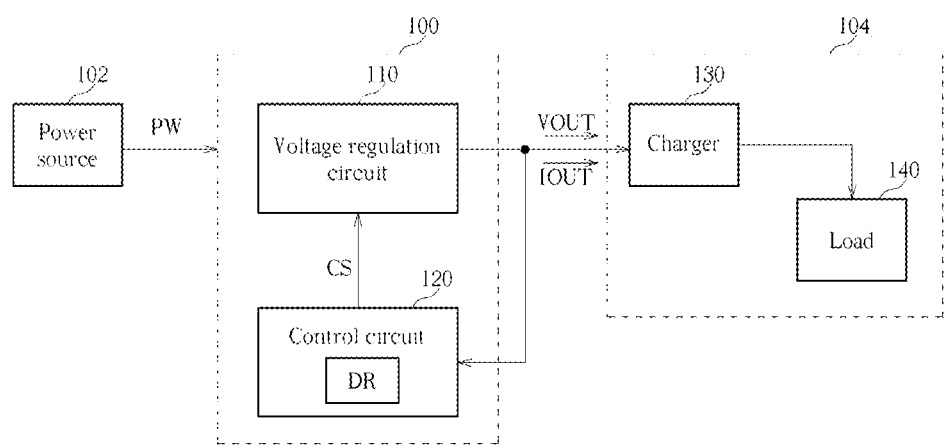
FIG. 1 is a block diagram illustrating an exemplary power transfer circuit according to an embodiment of the present invention.

Please refer to FIG. 1, which is a block diagram illustrating an exemplary power transfer circuit according to an embodiment of the present invention. The power transfer circuit 100 may transfer an electrical power PW from a power source 102 to a charger 130, wherein the power source 102 may transmit the electrical power PW to the power transfer circuit 100 in a wireless or wired manner. For example, the power source 102 and the power transfer circuit 100 may be implemented by a wireless charging transmitter (or a wireless transmitter unit (PTU)) and a wireless charging receiver (or a wireless receiver unit (PRU)) respectively, and the power source 102 may transmit the electrical power PW to the power transfer circuit 100 through inductive coupling. In another example, the power source 102 and the power transfer circuit 100 may be implemented by a mains supply and a power adaptor respectively.

The charger 130 may charge a load 140 according to power received from the power transfer circuit 100. By way of example but not limitation, the charger 130 and the load 140 may be included in an electronic apparatus 140, wherein the charger 130 may be implemented by a switching charger or a linear charger, the load 140 may be implemented by a battery unit, and the electronic apparatus 140 may be implemented by a mobile phone, a tablet computer or other types of rechargeable electronic apparatus. The power transfer circuit 100 may be implemented by a wireless charging receiver stuck to the electronic apparatus 104 such as a mobile phone. Hence, the electronic apparatus 104 may be charged in a wireless manner. Please note that this is not meant to be a limitation of the present invention. In an alternative design, the power transfer circuit 100 may be implemented by a wireless charging receiver built in a rechargeable electronic apparatus including the charger 130 and the load 140. In other words, the power transfer circuit 100, the charger 130 and the load 140 may be integrated into a single electronic apparatus.

In this embodiment, the power transfer circuit 100 may provide an output voltage VOUT for the charger 130, wherein the charger 130 may draw an output current IOUT from the power transfer circuit 100 according to the output voltage VOUT. By way of example but not limitation, the charger 130 may employ adaptive input current control (AICC) and PAM to dynamically adjust the output current IOUT in response to the output voltage VOUT. Additionally, the power transfer circuit 100 may detect the output current IOUT drawn by the charger 130 and accordingly adjust the output voltage VOUT. Hence, the power transfer circuit 100 may proclaim a power capability thereof to the charger 130, and detect the output current IOUT to determine whether power supplied to the charger 130 exceeds the power capability. When detecting that the power supplied to the charger 130 reaches/exceeds the power capability, the power transfer circuit 100 may adjust the output voltage VOUT to inform the charger 130 that the power capability is reached/exceeded, and the charger 130 may adjust an amount of the output current IOUT accordingly.

By way of example but not limitation, the power transfer circuit 100 may include a voltage regulation circuit 110 and a control circuit 120. The voltage regulation circuit 110 may provide the output voltage VOUT for the charger 130, wherein the charger 130 may draw the output current IOUT from the voltage regulation circuit 110 according to the output voltage VOUT. The control circuit 120 is coupled to the voltage regulation circuit 110, and may be arranged for detecting the output current IOUT to generate a detection result DR, and generating a control signal CS at least according to the detection result DR, wherein the voltage regulation circuit 110 may adjust the output voltage VOUT according to the control signal CS. Hence, when detecting that the output current IOUT is too high (the power supplied to the charger 130 exceeds the proclaimed power capability), the control circuit 120 may control the voltage regulation circuit 110 to adjust the output voltage VOUT in order to enable the charger 130 to adjust the amount of the output current IOUT drawn from the voltage regulation circuit 110, thereby reducing the power supplied to the charger 130 to satisfy the proclaimed power capability.

Figure 2:
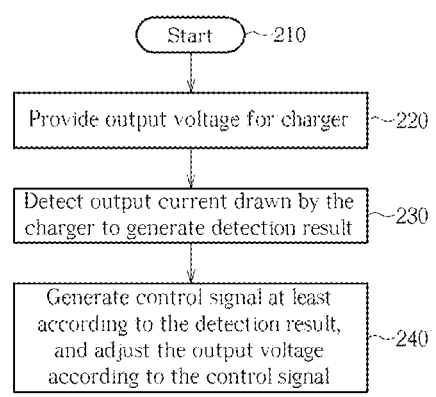
FIG. 2 is a flow chart of an exemplary power transfer method for transferring electrical power to a charger according to an embodiment of the present invention.

The above-described power transfer mechanism employed in the power transfer circuit 100 may be summarized in FIG. 2. FIG. 2 is a flow chart of an exemplary power transfer method for transferring electrical power to a charger according to an embodiment of the present invention. For illustrative purposes, the power transfer method shown in FIG. 2 is described with reference to the power transfer circuit 100 shown in FIG. 1. One skilled in the art should understand that this is not meant to be a limitation of the present invention. The power transfer method shown in FIG. 2 may be summarized below.

Step 210: Start. For example, the power source 102 may transmit the electrical power PW to the power transfer circuit 100 to start a charging process.

Step 220: Provide an output voltage (e.g. the output voltage VOUT) for the charger (e.g. the charger 130), wherein the charger may draw an output current IOUT (e.g. the output current IOUT) according to the output voltage.

Step 230: Detect the output current drawn by the charger to generate a detection result (e.g. the detection result generated by the control circuit 120).

Step 240: Generate a control signal (e.g. the control signal CS) at least according to the detection result, and adjust the output voltage according to the control signal. For example, the control circuit 120 may generate the control signal CS at least according to the detection result DR, and adjust the output voltage VOUT according to the control signal CS.

In step 220, the charger 130 may employ AICC and PAM to draw the output current IOUT from the voltage regulation circuit 110 in response to the output voltage VOUT.

In step 230, the control circuit 120 may detect the output current IOUT in an indirect manner. For example, the control circuit 120 may calculate the output current IOUT based on an input voltage, an input current and/or the output voltage VOUT of the voltage regulation circuit 110. In an alternative design, it is possible to detect the output current IOUT in a direct manner. For example, the control circuit 120 may include a current sensor (not shown in FIG. 1) which may sense the output current IOUT directly.

In step 240, the control circuit 120 may further refer to other information to control the voltage regulation circuit 110 to adjust the output voltage VOUT. For example, the control circuit 120 may refer to an operating scenario of the power transfer circuit 100 (or the electronic apparatus 104)

and the output current IOUT to control the output voltage VOUT. Further description of the operating scenario is provided later.

Please note that the above is for illustrative purposes only, and is not meant to be a limitation of the present invention. For example, provided that the result is substantially the same, the steps are not required to be executed in the exact order shown in FIG. 2 and are not required to be contiguous, and other intermediate steps can be added. In addition, the power transfer method shown in FIG. 2 is not limited to being employed in the power transfer circuit 100 shown in FIG. 1. As long as a power transfer structure may proclaim a power capability thereof, detect an output current drawn by a charger and accordingly adjust an output voltage of the power transfer structure to satisfy the proclaimed power capability, associated modifications and alternatives fall within the scope of the present invention.

For a better understanding of the present invention, the proposed power transfer mechanism is described with reference to a wireless charging receiver capable of proclaiming a power capability in the following. However, one skilled in the art should understand that this is not meant to be a limitation of the present invention. Please refer to FIG. 3, which is a block diagram illustrating an exemplary wireless charging receiver according to an embodiment of the present invention. The power source 102 and the power transfer circuit 100 shown in FIG. 1 may be implemented by the wireless charging transmitter 302 and the wireless charging receiver 300, wherein the wireless charging receiver 300 is capable of proclaiming a power capability thereof, and is arranged for transferring the electrical power PW from the wireless charging transmitter 302 to the charger 130 (or the electronic apparatus 104). Specifically, the wireless charging receiver 300 may proclaim the power capability thereof, and adjust an output voltage thereof based on an output current drawn by the charger 130 so as to inform the charger 130 of the proclaimed power capability, thus prevent collapse of the wireless charging transmitter 302.

In this embodiment, the wireless charging receiver 300 may include, but is not limited to, a voltage regulator 310 and a control circuit 320, wherein the voltage regulation circuit 110 and the control circuit 120 shown in FIG. 1 may be implemented by the voltage regulator 310 and the control circuit 320 respectively, wherein the voltage regulator 310 may be a linear regulator (e.g. a low-dropout (LDO) regulator) or a switching regulator (e.g. a buck converter). The voltage regulator 310 may receive an input voltage VIN and an input current IIN generated in response to the electrical power PW, and generate the output voltage VOUT and the output current IOUT according to the input voltage VIN and the input current IIN.

The control circuit 320 may detect the output current IOUT according to the input voltage VIN, the input current IIN and the output voltage VOUT to thereby generate the detection result DR. For example, the control circuit 320 may refer to a relationship between an input (the input voltage VIN and the input current IIN) and an output (the output voltage VOUT and the output current IOUT) of the voltage regulator 310 to derive an amount of the output current IOUT. Specifically, the output current IOUT may be expressed as a function of the input voltage VIN, the input current IIN and the output voltage VOUT as follows:

$$IOUT=f(VIN,IIN,VOUT)$$

By way of example but not limitation, the control circuit 320 may include a calculation circuit 322 and a voltage programmer 324. The calculation circuit 322 may calculate the output current IOUT according to the input voltage VIN, the input current IIN and the output voltage VOUT so as to generate the detection result DR. The voltage programmer 324 is coupled to the calculation circuit 322, and may generate the control signal CS according to the detection result DR. In a case where energy conversion efficiency of the voltage regulator 310 is represented by the output current IOUT may be expressed by the following equation:

$$IOUT=\eta \times VOUT/(VIN \times IIN)$$

Please note that as the control circuit 320 may detect the output current IOUT in an in direct manner, no additional circuit used for sensing the output current IOUT is required.

Figure 3:
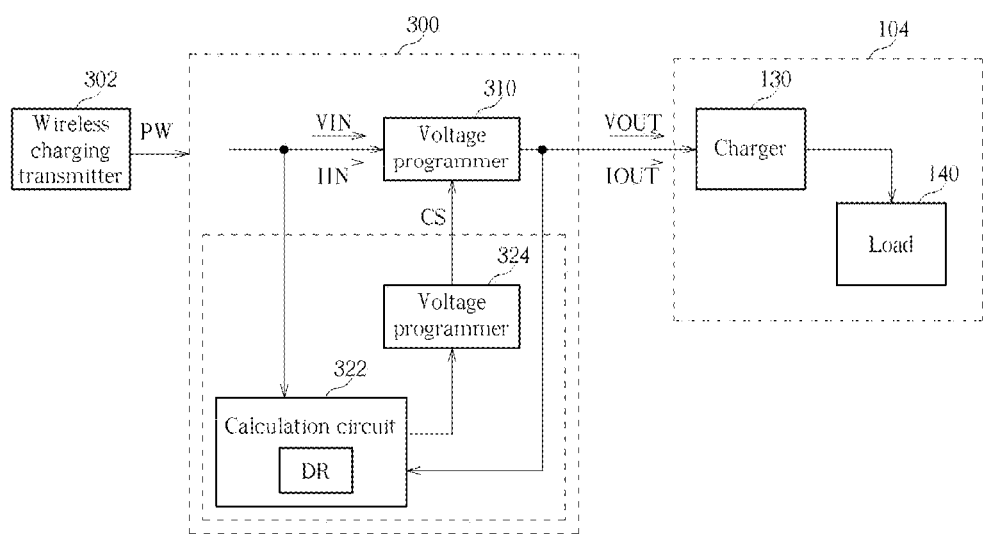
FIG. 3 is a block diagram illustrating an exemplary wireless charging receiver according to an embodiment of the present invention.
Figure 4:
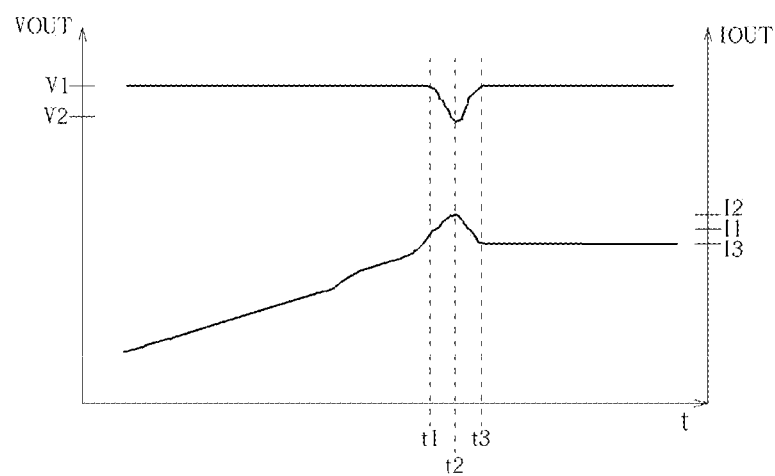
FIG. 4 is a plot illustrating an output voltage versus time relationship and an output current versus time relationship associated with the wireless charging receiver shown in FIG. 3 according to an embodiment of the present invention.

Additionally, in this embodiment, when the wireless charging receiver 300 starts to transfer the electrical power PW from the wireless charging transmitter 302 to the charger 130 to charge the load 140, the charger 130 may perform a power capability test before starting to charge the load 140, and the wireless charging receiver 300 may adaptively adjust the output voltage VOUT in response to the output current IOUT so as to inform the charger 130 of the proclaimed power capability of the wireless charging receiver 300. Please refer to FIG. 4 together with FIG. 3. FIG. 4 is a plot illustrating an output voltage versus time relationship and an output current versus time relationship associated with the wireless charging receiver 300 shown in FIG. 3 according to an embodiment of the present invention.

As shown in FIG. 4, before starting to charge the load 140, the charger 130 may increasingly draw the output current IOUT so as to test the proclaimed power capability of the wireless charging receiver 300. When the detection result DR indicates that the output current IOUT is greater than or equal to a predetermined current level I1 (between points in time t1 and t2), the voltage regulator 310 may decrease the output voltage VOUT (having an initial voltage level V1 such as 5 volts) according to the control signal CS.

In this embodiment, when the output voltage VOUT is decreased to be less than or equal to a predetermined voltage level V2, the charger 130 may reduce the amount of the output current IOUT drawn from the voltage regulator 310. In other words, when receiving the output voltage VOUT less than or equal to the predetermined voltage level V2, the charger 130 employs PAM to adjust the output current IOUT drawn from the voltage regulator 310. Hence, the voltage regulator 310 may decrease the output voltage VOUT to be less than or equal to the predetermined voltage level V2 so as to prevent the charger 130 from drawing too large a current (e.g. at a point in time t2), wherein the predetermined voltage level V2 may be regarded as a PAM level. The power collapse of the wireless charging transmitter 302 can be avoided accordingly.

Further, after the charger 130 reduces the amount of the output current IOUT drawn from the voltage regulator 310 in response to a decrease in the output voltage VOUT, the voltage regulator 310 may increase the output voltage VOUT so as to inform the charger 130 of the proclaimed power capability. For example, after the charger 130 reduces the amount of the output current IOUT at the point in time t2 due to a decrease in the output voltage VOUT from the initial voltage level V1 to the predetermined voltage level V2, the voltage regulator 310 may increase the output voltage VOUT (between points in time t2 and t3). In this embodiment, the charger 130 may decrease the output current IOUT from a current level I2 to a current level I3, wherein the product of the initial voltage level V1 and the current level I3 may correspond to the proclaimed power capability of the wireless charging receiver 300.

Figure 5:
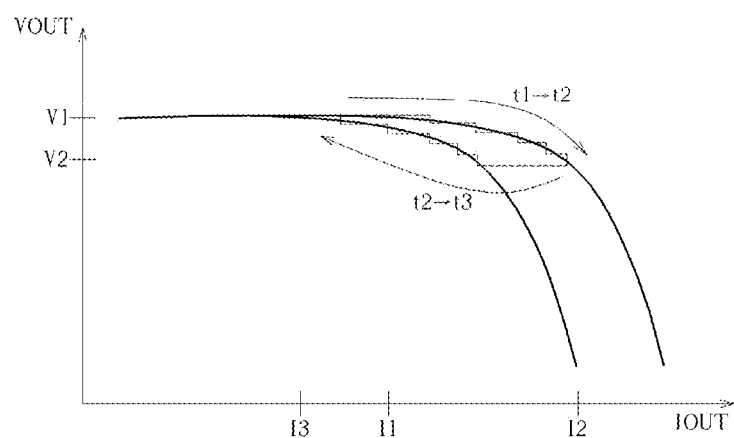
FIG. 5 is a plot illustrating an output voltage versus output current relationship associated with the wireless charging receiver shown in FIG. 3 according to an embodiment of the present invention.

In view of the above, once the wireless charging receiver 300 starts to supply power to the charger 130 for wireless charging, the wireless charging receiver 300 may let the charger 130 know the proclaimed capability thereof to thereby avoid power collapse. The relationship between the output voltage VOUT and the output current IOUT shown in FIG. 4 is illustrated in FIG. 5. As a person skilled in the art should understand the operation associated with the output voltage versus output current relationship shown in FIG. 5 after reading the paragraphs directed to FIG. 3 and FIG. 4, similar description is not repeated here for brevity.

Please note that the above is for illustrative purposes only, and is not meant to be a limitation of the present invention. In alternative embodiments, the proposed control circuit may use different algorithms to calculating the output current IOUT. For example, in a case where the voltage regulator 310 shown in FIG. 3 is implemented by a LDO regulator whose input voltage substantially equals to output voltage, the calculation circuit 322 may calculate the output current IOUT based on the input current IIN and one of the input voltage VIN and the output voltage VOUT. In other words, the calculation circuit 322 may use corresponding algorithm(s) to calculate the output current IOUT according to actual requirements/designs such as a circuit structure of the control circuit 320 (or the voltage regulator 310). The calculation circuit 322 can be implemented by DSP and/or analog circuitry.

In some alternative embodiments, the output voltage VOUT and the output current IOUT may vary in a stepwise manner. For example, the voltage programmer 324 shown in FIG. 3 may be implemented by a digital-to-analog converter (DAC) and generate the control signal CS which varies in a discontinuous manner. Hence, the voltage regulator 310 may adjust the output voltage VOUT according to the control signal CS in a stepwise manner, which is depicted by dashed lines shown in FIG. 5.

Additionally, the output voltage VOUT versus time t relationship shown in FIG. 4 is for illustrative only. As long as the proposed power transfer circuit may adjust an output voltage thereof to change an output current drawn by a charger and inform the charger of a proclaimed power capability thereof, associated modifications and alternatives fall within the scope of the present invention. Additionally, the calculation circuit 322 can be programmable. In this way, the predetermined voltage level V2 (or the proclaimed output power limit) can be adjusted dynamically by programming the calculation circuit 322.

The output current IOUT versus time t relationship shown in FIG. 4 is for illustrative only. As long as the voltage adjustment performed by the proposed power transfer circuit may satisfy the principle of AICC and PAM of the charger, different output current versus time relationships also fall within the scope of the present invention. Note that the proposed regulation circuit 110 is configured to program the output voltage level VOUT, rather than to limit the output current level IOUT, in order to toggle PAM scheme of the charger for the purpose of power proclaiming.

Further, the proposed power proclamation mechanism is not limited to being employed in an initial charging stage. The proposed power proclamation mechanism may be employed at any time in a charging process. By way of example but not limitation, when detecting an overcurrent condition (e.g. an output current drawn by a charger is greater than a predetermined current level), the proposed power transfer circuit may adjust/decrease an output voltage thereof to adjust/decrease the output current to be less than the predetermined current level.

Figure 6:
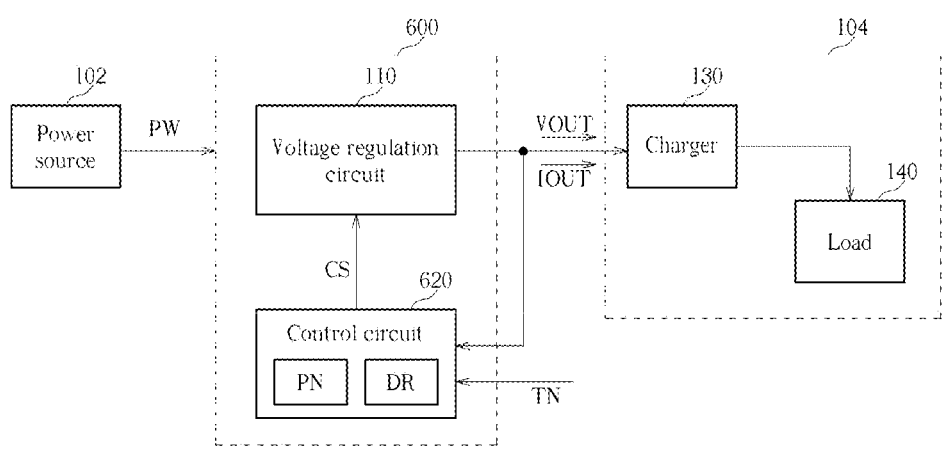
FIG. 6 is a block diagram illustrating an exemplary power transfer circuit according to an embodiment of the present invention.
Figure 7:
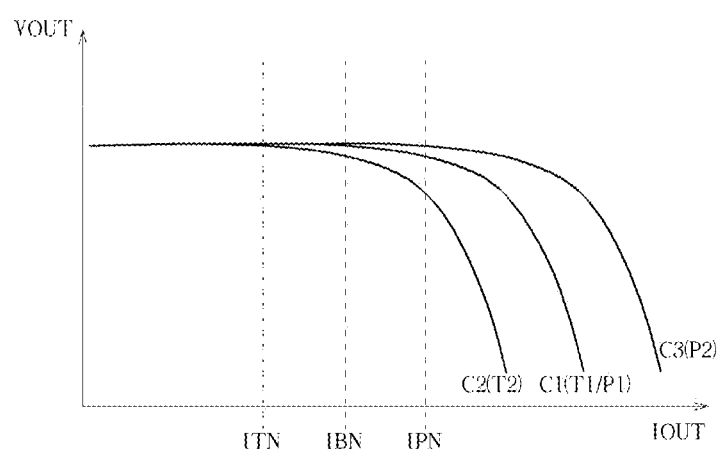
FIG. 7 is a plot illustrating output voltage versus output current relationships associated with the power transfer circuit shown in FIG. 6 according to an embodiment of the present invention.

Moreover, the proposed power transfer mechanism may provide/program various output voltage versus output current relationships in response to different operating scenarios. Please refer to FIG. 6 together with FIG. 7. FIG. 6 is a block diagram illustrating an exemplary power transfer circuit according to an embodiment of the present invention, and FIG. 7 is a plot illustrating output voltage versus output current relationships associated with the power transfer circuit 600 shown in FIG. 6 according to an embodiment of the present invention. The structure of the power transfer circuit 600 is based on that of the power transfer circuit 100 shown in FIG. 1, wherein the main difference is that the control circuit 620 further refers to at least one of temperature information TN and power information PN to generate the control signal CS. Please note that it is possible to employ the voltage regulator 310 and the control circuit 320 shown in FIG. 3 to implement the regulation circuit 110 and the control circuit 620 shown in FIG. 6.

Consider an embodiment where the control circuit 620 generates the control signal CS according to the detection result DR and the temperature information TN. In this embodiment, the control circuit 620 may detect the output current IOUT to generate the detection result DR, and receive the temperature information TN indicating a temperature of the load 140, wherein the charger 130 charges the load 140 according to the output current IOUT. By way of example but not limitation, the control circuit 620 may sense a temperature of a circuit board of the electronic apparatus 104 to generate the temperature information TN. In another example, the control circuit 620 may receive temperature information TN generated by a thermistor of the load 140 (not shown in FIG. 6).

In this embodiment, when the temperature of the load 140 equals to a temperature value T1, the output voltage VOUT versus output current IOUT relationship may be represented by a voltage-current (V-I) curve C1. The control circuit 620 may determine a predetermined current level IBS according to the temperature information TN, wherein when the detection result DR indicates that the output current IOUT is greater than the predetermined current level IBS, the voltage regulation circuit 110 may decrease the output voltage VOUT according to the control signal CS. In other words, when the output current IOUT is greater than the predetermined current level IBS, the power transfer circuit 600 may start to adjust the output voltage VOUT to inform the charger 130 that power drawn from the power transfer circuit 600 is too high.

When the temperature information TN indicates that the temperature of the load 140 varies, the control circuit 620 may adjust the predetermined current level IBS accordingly. For example, when the temperature information TN indicates that the temperature of the load 140 increases from the temperature value T1 to a temperature value T2, the control circuit 620 may decrease the predetermined current level IBS to a predetermined current level ITN according to the temperature information TN so as to prevent the electronic apparatus 104 form overheating. Specifically, when the temperature of the load 140 equals to the temperature value T2, the output voltage VOUT versus output current IOUT relationship may be represented by a V-I curve C2. Similarly, when the temperature information TN indicates that the temperature of the load 140 decreases, the control circuit 620 may increase the predetermined current level IBS.

Consider another embodiment where the control circuit 620 generates the control signal CS according to the detection result DR and the power information PN. In this embodiment, the control circuit 620 may detect the electrical power PW (i.e. power received from the power source 102) to generate the power information PN.

In this embodiment, when the electrical power PW equals to a power level P1, the output voltage VOUT versus output current IOUT relationship may be represented by the voltage-current (V-I) curve C1. The control circuit 620 may determine the predetermined current level IBS according to the power information PN, wherein when the detection result DR indicates that the output current IOUT is greater than the predetermined current level IBS, the voltage regulation circuit 110 may decrease the output voltage VOUT according to the control signal CS.

When the power information PN indicates that the electrical power PW varies, the control circuit 620 may adjust the predetermined current level IBS accordingly. For example, when power supplied by the power source 102 is shared by the electronic apparatus 104 and another electronic apparatus (not shown in FIG. 6), the power information PN may indicate that the electrical power PW (i.e. the power received from the power source 102) decreases (i.e. power transferred to the electronic apparatus 104 decreases). Hence, the control circuit 620 may increase the predetermined current level IBS to a predetermined current level IPN according to the power information PN so as to provide sufficient power for the charger 130. Specifically, when the electrical power PW equals to a power level P2 less than the power level P1, the output voltage VOUT versus output current IOUT relationship may be represented by a V-I curve C3 Similarly, when the electrical power PW increases, the control circuit 620 may decrease the predetermined current level IBS.

In view of the above, the power transfer circuit 600 may program the V-I curve according to operating scenarios. Specifically, the proposed power transfer mechanism may provide a programmable V-I curve for a charger.

To sum up, the proposed power transfer mechanism may proclaim a power capability to a charger so as to reduce/eliminate the chance of power collapse, and program a V-I curve suitable for the charger according to operating scenarios.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A power transfer method for transferring electrical power to a charger, comprising:
   providing an output voltage for the charger, wherein the charger draws an output current according to the output voltage;
   detecting the output current to generate a detection result; and
   generating a control signal at least according to the detection result, and adjusting the output voltage according to the control signal,
   wherein when the detection result indicates that the output current is greater than or equal to a predetermined current level, the step of adjusting the output voltage according to the control signal comprises:
   decreasing the output voltage according to the control signal,
   wherein when the output voltage is less than or equal to a predetermined voltage level, the charger reduces an amount of the drawn output current; and the step of decreasing the output voltage comprises:
   decreasing the output voltage to be less than or equal to the predetermined voltage level.

2. The power transfer method of claim 1, wherein the step of providing the output voltage for the charger comprises:
   receiving an input voltage and an input current generated in response to the electrical power, and generating the output voltage and the output current according to the input voltage and the input current; and
   the step of detecting the output current to generate the detection result comprises:
   calculating the output current according to the input voltage, the input current and the output voltage so as to generate the detection result.

3. The power transfer method of claim 1, further comprising:
   receiving temperature information indicating a temperature of a load, wherein the charger charges the load according to the output current; and
   the step of generating the control signal at least according to the detection result comprises:
   generating the control signal according to the detection result and the temperature information.

4. The power transfer method of claim 1, further comprising:
   detecting the electrical power to generate power information; and
   the step of generating the control signal at least according to the detection result comprises:
   generating the control signal according to the detection result and the power information.

5. The power transfer method of claim 4, wherein the step of adjusting the output voltage according to the detection result and the power information comprises:
   determining a predetermined current level according to the power information; and
   when the detection result indicates that the output current is greater than the predetermined current level, generating the control signal; and
   the step of adjusting the output voltage according to the control signal comprises:
   decreasing the output voltage according to the control signal.

6. The power transfer method of claim 5, wherein when the power information indicates that the electrical power decreases, the step of determining the predetermined current level according to the power information comprises:
   decreasing the predetermined current level.

7. A power transfer method for transferring electrical power to a charger, comprising:
   providing an output voltage for the charger, wherein the charger draws an output current according to the output voltage;
   detecting the output current to generate a detection result; and
   generating a control signal at least according to the detection result, and adjusting the output voltage according to the control signal,
   wherein when the detection result indicates that the output current is greater than or equal to a predetermined current level, the step of adjusting the output voltage according to the control signal comprises:
   decreasing the output voltage according to the control signal,
   wherein after the charger reduces an amount of the drawn output current in response to a decrease in the output voltage, the step of adjusting the output voltage according to the control signal further comprises:

increasing the output voltage according to the control signal.

8. The power transfer method of claim 7, wherein the step of providing the output voltage for the charger comprises:
receiving an input voltage and an input current generated in response to the electrical power, and generating the output voltage and the output current according to the input voltage and the input current; and
the step of detecting the output current to generate the detection result comprises:
calculating the output current according to the input voltage, the input current and the output voltage so as to generate the detection result.

9. The power transfer method of claim 7, further comprising:
receiving temperature information indicating a temperature of a load, wherein the charger charges the load according to the output current; and
the step of generating the control signal at least according to the detection result comprises:
generating the control signal according to the detection result and the temperature information.

10. The power transfer method of claim 7, further comprising:
detecting the electrical power to generate power information; and
the step of generating the control signal at least according to the detection result comprises:
generating the control signal according to the detection result and the power information.

11. The power transfer method of claim 10, wherein the step of adjusting the output voltage according to the detection result and the power information comprises:
determining a predetermined current level according to the power information; and
when the detection result indicates that the output current is greater than the predetermined current level, generating the control signal; and
the step of adjusting the output voltage according to the control signal comprises:
decreasing the output voltage according to the control signal.

12. The power transfer method of claim 11, wherein when the power information indicates that the electrical power decreases, the step of determining the predetermined current level according to the power information comprises:
decreasing the predetermined current level.

13. A power transfer method for transferring electrical power to a charger, comprising:
providing an output voltage for the charger, wherein the charger draws an output current according to the output voltage;
detecting the output current to generate a detection result;
generating a control signal at least according to the detection result, and adjusting the output voltage according to the control signal; and
receiving temperature information indicating a temperature of a load, wherein the charger charges the load according to the output current; and
the step of generating the control signal at least according to the detection result comprises:
generating the control signal according to the detection result and the temperature information, wherein the step of generating the control signal according to the detection result and the temperature information comprises:
determining a predetermined current level according to the temperature information; and
when the detection result indicates that the output current is greater than the predetermined current level, generating the control signal; and
the step of adjusting the output voltage according to the control signal comprises:
decreasing the output voltage according to the control signal.

14. The power transfer method of claim 13, wherein when the temperature information indicates that the temperature of the load increases, the step of determining the predetermined current level according to the temperature information comprises:
decreasing the predetermined current level.

* * * * *